United States Patent [19]
Monks

[11] 3,724,348
[45] Apr. 3, 1973

[54] MEANS FOR PREVENTING FILM MOVEMENT IN A CAMERA

[75] Inventor: David E. Monks, Rochester, N.Y.

[73] Assignee: Eastman Kodak Company, Rochester, N.Y.

[22] Filed: Apr. 12, 1972

[21] Appl. No.: 243,361

[52] U.S. Cl. .................. 95/31 R, 95/31 FM, 226/59
[51] Int. Cl. ........................ G03b 19/04, G03b 1/42
[58] Field of Search .......... 93/31 FM, 31 AC, 31 R; 226/59, 147, 149

[56] References Cited

UNITED STATES PATENTS

| 645,370 | 3/1900 | McCurdy | 235/91 |
| 2,419,759 | 4/1947 | Briskin et al. | 226/59 |
| 3,605,597 | 9/1971 | Katsuyama | 95/31 R |

Primary Examiner—Robert P. Greiner
Attorney—W. H. J. Kline et al.

[57] ABSTRACT

A camera includes a transport mechanism for advancing perforated film along an exposure plane. A film sensing pawl is movable between a retracted position on one side of and spaced from the exposure plane and a position transversing the exposure plane through a film perforation to disable the transport mechanism when the perforation reaches a predetermined position. The sensing pawl may be held in its retracted position when the film is not being advanced. A second pawl which is fixed in the housing on one side of and transversing the exposure plane enters a film perforation after the film has been advanced to prevent film movement. The second pawl may be aligned with the film sensing pawl in a direction transverse to the direction of film advance so that both the second pawl and the film sensing pawl enter the same perforation when the sensing pawl is in its extended position.

6 Claims, 5 Drawing Figures

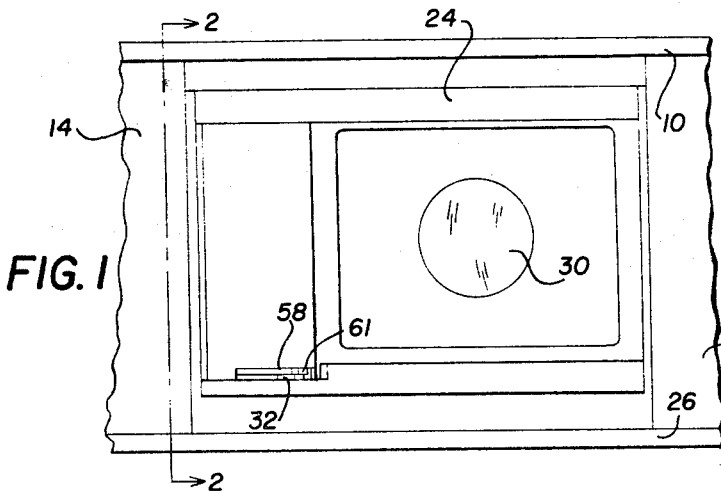
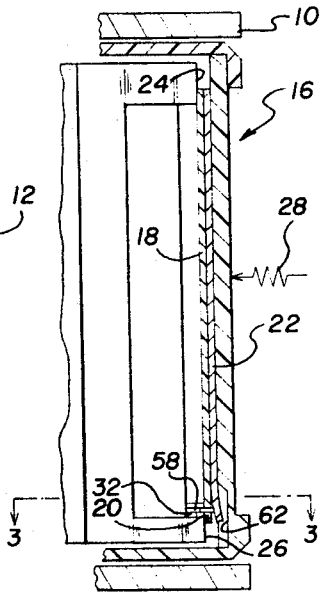
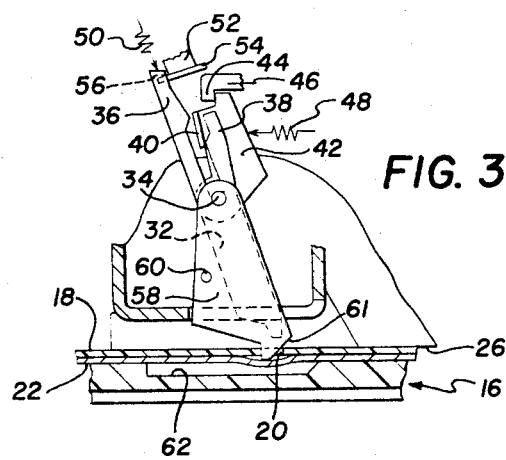
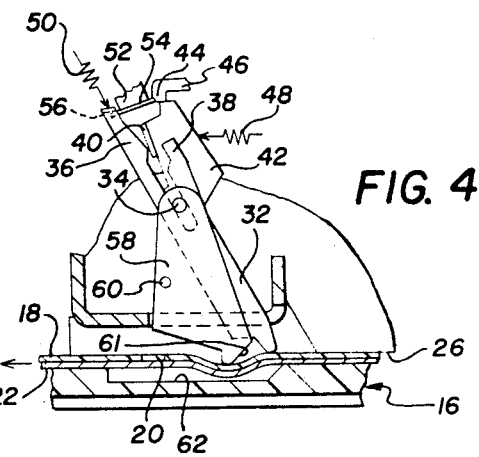
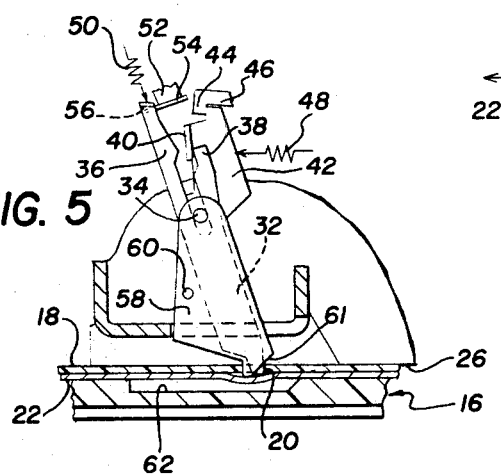

MEANS FOR PREVENTING FILM MOVEMENT IN A CAMERA

CROSS-REFERENCE TO RELATED APPLICATIONS

Reference is made to commonly assigned copending U.S. Pat. applications Ser. No. 203,524 entitled FILM METERING MECHANISM FOR CAMERAS, filed Dec. 1, 1971 in the name of David E. Beach; Ser. No. 203,732 entitled FILM ADVANCE AND METERING MECHANISM FOR CAMERAS, filed Dec. 1, 1971 in the name of Alexander A. Peters; Ser. No. 203,733 entitled CAMERA, filed Dec. 1, 1971 in the names of David E. Beach and Jeffrey R. Stoneham; Ser. No. 209,209 entitled FILM CREEP PREVENTING MEANS, filed Dec. 17, 1971 in the name of David E. Beach; and Ser. No. 217,808 entitled FILM MOVEMENT PREVENTING MEANS, filed Jan. 14, 1972 in the name of James E. Dierks.

BACKGROUND OF THE INVENTION

1. Field of the Invention

This invention relates to devices for metering perforating film in roll film cameras, and more particularly to such a device adapted to eliminate or reduce the risk of film movement in the camera after the film has been advanced.

2. Description of the Prior Art

Devices for metering successive roll film exposures by arresting the film winding mechanism in response to the sensing of perforations or notches precut in the film at specific intervals are old and well known in the art. Commonly assigned, U.S. Pat. application Ser. No. 203,733, entitled CAMERA, filed on Dec. 1, 1971, in the names of David E. Beach et al. shows a camera film transport mechanism including a sensing pawl which detects the arrival of perforation at a predetermined location to disable the transport mechanism. A shutter release lever may then be depressed to first withdraw the sensing pawl from the perforation and to then activate the shutter mechanism to take a picture. While cameras having such devices are satisfactory, the operator must depress the shutter release lever with sufficient force to overcome the spring force urging the sensing pawl into the film perforation. This may tend to cause camera unsteadiness resulting in blurred pictures.

To overcome the above-mentioned problem of camera movement resulting from the excessive force required to overcome the spring force on the pawl, coassigned U.S. Pat. application Ser. No. 203,524 entitled FILM METERING MECHANISMS FOR CAMERAS, filed in the name of David E. Beach discloses an invention wherein a film sensing pawl is not removed from perforation by the shutter release lever, but instead remains in the film perforation until after a picture has been taken and the film transport mechanism has begun to advance film. The pawl is resiliently urged against the trailing edge of a perforation by a spring during the exposure period. It has been found that occasionally the pressure on the edge of the film perforation from the sensing pawl, coupled with vibrations in the camera during operation of the shutter, will cause film movement during the exposure interval, thereby causing blurred pictures.

One possible method of eliminating such film movement is to reduce the spring force on the pawl so that there is less tendency for the film to move. However, this may lead to early metering failure due to the fact that when the pawl is removed from the perforation, the spring which has urged the pawl against the trailing edge of the perforation is used to return the pawl to a ready position for detecting the presence of the next succeeding perforation to be advanced along the exposure plane. If the spring force has been reduced, the pawl may not return to its ready position because of the frictional resistance between the pawl and the film surface.

Another method of eliminating film movement caused by pressure from the sensing pawl on the trailing edge of the film perforation involves the addition of a one-way clutch member which contacts the film to permit film advance and to prevent film movement in the opposite direction. Such a mechanism is disclosed in coassigned U.S. Pat. application Ser. No. 217,808, entitled FILM MOVEMENT PREVENTING MEANS filed in the name of James E. Dierks on Jan. 14, 1972.

It has been found that problems described above can also be eliminated by leaving the pawl in the film perforations only during that period of time when the film is being advanced and by removing the pawl from the perforation before the picture-taking operation. Such a mechanism is shown in coassigned U.S. Pat. application Ser. No. 203,732, entitled FILM ADVANCE AND METERING MECHANISM FOR CAMERAS filed in the name of Alexander E. Peters on Dec. 1, 1971. This permits the use of relatively heavy spring for returning the pawl to its ready position without putting undue force on film during shutter operation, and yet eliminates the need for a large force on the shutter release lever to withdraw the pawl from the perforation during the picture-taking operation.

Unfortunately, it has been found that in cameras of the type disclosed in the Peters application, wherein the film sensing pawl is withdrawn from the perforation after the film has been advanced, there is a possibility of film creep. Film creep is the movement of film along the exposure plane toward the take-up chamber, and is caused by torsional forces on the take-up film roll. Normally, the static frictional forces on the film from camera and/or cartridge parts is sufficient to prevent such movement. However, if the camera is vibrated or jarred, such as for example by normal road vibrations in an automobile, the static friction forces may be overcome and the film may creep.

When a camera in which the film has creeped is used to take a picture, that exposure may slightly overlap the next succeeding exposure, producing a less satisfactory result. Further, since processors normally cut roll film at positions determined by the perforations in the film, and since the exposure frame of film which has creeped will be misaligned with the corresponding perforations, a portion of that frame will be cut away and will appear in the next frame.

The problem of film creep associated with cameras wherein the film sensing pawl is removed from a perforation after the film has been advanced can be eliminated by the mechanisms shown in coassigned U.S. Pat. application Ser. No. 209,209, entitled FILM CREEP PREVENTING MEANS FOR CAMERAS, filed in the name of David E. Beach on Dec. 17, 1971. In that patent application, a member is movable to a position contacting the film when the film sensing pawl is removed from the perforation to prevent the film from moving along the exposure plane. This film contacting member or brake is movable between an active position contacting the received film and an inactive position spaced from the film. The brake member may be moved to its active position either in response to the film transport mechanism being disabled after film has been advanced or it may be removed from the film only during operation of the film transport mechanism. While the brake mechanism is successful in operation to prevent film creep, it would have no effect in preventing film movement caused by the pressure on the film from the sensing pawl in cameras where the pawl is left in the film perforation during exposure as discussed with respect to hereinbefore mentioned U.S. Pat. application Ser. No. 203,524. Further, the brake mechanism comprises a plurality of moving parts which adds complexity and cost to the manufacture of the camera.

SUMMARY OF THE INVENTION

It is an objective of this invention to provide improved camera mechanism which obviates the problem of film creep, associated with cameras wherein the film sensing pawl is removed from a perforation after the film has been advanced, and the problem of film movement, associated with cameras wherein the film sensing pawl remains in the perforation during exposure. I have found these problems can be eliminated by providing a member or pawl mounted in the camera housing at a position to enter a film perforation when the film has been advanced to a proper position for exposing a frame. The member or pawl may have a bevelled edge transversing the exposure plane and facing in a direction generally opposed to the direction of film transport so that the trailing edge of perforation may cam over the end of the fixed pawl as the film is advanced. The fixed pawl may be laterally aligned with the film sensing pawl so as to enter the same perforation as the sensing pawl.

It will be seen from the following that, by the present invention, I have provided a device which will prevent film movement regardless of whether the sensing pawl remains in the film perforations during exposure.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 1 is a rear, elevational view of a portion of a camera in accordance with the present invention with the camera compartment door open;

FIG. 2 is a sectional view taken along line 2—2 of FIG. 1 and further showing a section of a film cartridge and film loaded into cameras;

FIG. 3 is a sectional view taken along line 3—3 of FIG. 2 showing the film sensing pawl in its position when the camera is ready to make an exposure;

FIG. 4 is a view similar to FIG. 3 showing the film sensing pawl position as film is advanced along the exposure plane; and FIG. 5 is a view similar to FIGS. 3 and 4 showing a film sensing pawl after the film has been advanced but before the pawl is withdrawn to its FIG. 3 position.

DESCRIPTION OF THE PREFERRED EMBODIMENT

Because cameras are well known, the present description will be directed in particular to elements forming part of or cooperating more directly with, apparatus in accordance with the present invention. It is to be understood that camera elements not specifically shown or described may take various forms well known to those skilled in the art.

Referring briefly to FIG. 1, the camera illustrated as a preferred embodiment has been shown from the rear of the camera with the door to the cartridge compartment removed or opened. The casing 10 of the camera forms a supply compartment 12 and a take-up compartment 14 for receiving respectively the supply and take-up chambers of a film cartridge 16 (FIG. 2). The cartridge may be of the type shown in coassigned U.S. Pat. No. 3,138,081 which issued on June 23, 1964 to Hubert Nerwin, and it may be loaded with a strip 18 of film having perforations 20 along one edge. The film may be backed by opaque paper 22. The camera has a pair of rails 24 and 26 against which the film is pressed by a spring 28 in the camera door, not shown. A lens 30 forms an image of the scene at the camera's exposure plane which is occupied by the emulsion side of film 18. A film sensing pawl 32 is mounted for rotational and longitudinal movement on a stud 34 (FIG. 3). Sensing pawl 32 has a pair of arms 36 and 38 which define a slot therebetween for receiving a tab 40 of a retainer 42. Retainer 42 is also rotatably carried by stud 34 and is urged in a counterclockwise direction into abutment with a tab 44 on a metering lever 46 by a spring 48. Another spring 50 urges sensing pawl 32 toward film 18.

A lifting lever 52 includes a tab 54 which underlies an abutment 56 on arm 36 of sensing pawl 32 to raise the sensing pawl to its FIG. 3 position except during film advance operation. The operation of this mechanism is fully described in hereinbefore mentioned Peters U.S. Pat. application Ser. No. 203,732, and the disclosure of that application is hereby specifically incorporated into this disclosure. FIG. 3 shows the elements of the camera in their respective positions after an unexposed frame of film has been wound to the exposure area. The camera is now ready to be operated to take a picture, and a metering pawl, not shown, on lever 46 is at its active position so that the film transport mechanism cannot be operated to advance film. With film sensing pawl 32 retracted to its position spaced from the exposure plane, the film is susceptible to creep should the camera be vibrated. That is, torsional forces on the film may cause the film to move toward the take-up chamber so that the next exposure is misaligned.

To prevent such film creep, I have provided a second, fixed pawl 58 which is mounted on stud 34 and a stud 60. Pawl 58 extends beyond the exposure plane so as to enter a film perforation when the film has been advanced to a position preparatory to taking a picture. By engaging the trailing edge of the perforation, fixed pawl 58 prevents film creep along the exposure plane. Further, since the end of pawl 58 engages backing paper 22, friction between the pawl and the backing paper will also aid in preventing film creep.

FIG. 4 shows the camera elements in their respective positions as film 18 and paper 22 are being advanced along the exposure plane toward take-up compartment 14. As described in the Peters application, after a picture has been taken, metering lever 46 is raised so that spring 48 rotates sensing pawl 32 in a counterclockwise direction. As the film is advanced, lifting lever 52 is lowered as described in the Peters application so that spring 50 may lower the sensing pawl into contact with the film surface as shown in FIG. 4. Fixed pawl 58 has a cammed or bevelled surface 61 which faces in a direction generally opposed to the direction of film transport so that the trailing edge of a perforation may be easily cammed around the pawl as the film is advanced. FIG. 4 shows that the film and its backing paper are moved around fixed pawl 58 into a recess 62 in the cartridge as the film is advanced. As the next exposure area of the film nears the camera's exposure aperture, pawl 32 falls into a perforation and is carried thereby to the position shown in FIG. 5. This permits metering lever 46 to fall from retainer 48 and lock up the film advance mechanism. Sensing pawl 32 is then raised to its FIG. 1 position preparatory to making an exposure.

It will be noted that in the preferred embodiment, sensing pawl 32 and fixed pawl 58 are aligned laterally of the direction of film travel so that they enter the same perforation. It will, of course, occur to those skilled in the art that fixed pawl 58 may be spaced from sensing pawl 32 in the direction of film travel so as to enter a different perforation from sensing pawl 32.

While in the illustrated embodiment, sensing pawl 32 is withdrawn from the perforation during exposure so that fixed pawl 50 prevents film creep, it will be recognized that the sensing pawl may be left in the perforation as in beforementioned U.S. application Ser. No. 203,524. Since the sensing pawl is resiliently urged by spring 48 against the trailing edge of the perforation, film movement toward supply compartment 12 might occur during exposure. However, by contacting the leading (left) edge of the perforation, fixed pawl 58 prevents such film movement.

The invention has been described in detail with particular reference to the preferred embodiment thereof, but it will be understood that variations and modifications can be effected within the spirit and scope of the invention.

I claim:

1. In a still camera having (1) a housing including spaced take-up and supply compartments for receiving respectively take-up and supply rolls of film perforated at predetermined metering intervals, (2) means defining an exposure plane between said compartments, (3) transport means for advancing received film along said exposure plane from said supply compartment to said take-up compartment, (4) a metering mechanism having an active condition disabling said transport means and an inactive condition, (5) a film sensing pawl mounted on said housing for movement from a retracted position on one side of said exposure plane to a locking position transversing said exposure plane when intercepting one of said perforations, and (6) means, interconnecting said metering mechanism and said film sensing pawl, for placing said metering mechanism in its active condition when said sensing pawl is moved to its locking position; the improvement comprising a second pawl mounted in said housing on one side of and transversing said exposure plane, said second pawl being positioned to enter a film perforation when said sensing pawl moves to its locking position for preventing film movement along said exposure plane.

2. The improvement as defined in claim 1 wherein said second pawl has a bevelled edge transversing said exposure plane and facing generally toward said supply compartment, whereby the trailing edge of a preforation through which said second pawl extends may cam over said second pawl as the film is advanced.

3. The improvement as defined in claim 1 wherein said sensing pawl and said second pawl are coaligned in a direction transverse to the direction of film advance, whereby both pawls are in the same film perforation when said sensing pawl is in its predetermined extended position.

4. In a still camera having (1) a housing defining a space for receiving roll film perforated at predetermined metering intervals, (2) means defining an exposure plane, (3) transport means operable for advancing received film along said exposure plane, (4) a film sensing pawl movable between a retracted position on one side of said exposure plane and a predetermined extended position transversing said exposure plane through one of the film perforations to detect the presence of a perforation at a predetermined position, (5) metering means interconnecting said sensing pawl and said transport means for disabling said transport means when said sensing pawl detects the presence of a perforation at said predetermined position, and (6) means interconnecting said transport means and said sensing pawl for returning said sensing pawl to its retracted position except during operation of said transport means; the improvement comprising a second pawl fixed in said housing on one side of and transversing said exposure plane, said second pawl being positioned to enter a film perforation when said sensing pawl detects the presence of a perforation at said predetermined position for preventing film movement along said exposure plane.

5. The improvement as defined in claim 4 wherein said sensing pawl has a bevelled edge transversing said exposure plane and facing in a direction generally opposed to the direction of film transport, whereby the trailing edge of a perforation may cam over said second pawl as the film is advanced.

6. The improvement as defined in claim 1 wherein said second pawl is adjacent to said sensing pawl in a direction transverse to the direction of film advance, whereby both pawls enter a film perforation at said predetermined position.

* * * * *